United States Patent
Klausner

(10) Patent No.: US 6,489,934 B1
(45) Date of Patent: Dec. 3, 2002

(54) CELLULAR PHONE WITH BUILT IN OPTICAL PROJECTOR FOR DISPLAY OF DATA

(76) Inventor: Judah Klausner, 920 Fifth Ave., New York, NY (US) 10021

(*) Notice: Subject to any disclaimer, the term of this patent is extended or adjusted under 35 U.S.C. 154(b) by 0 days.

(21) Appl. No.: 09/611,436

(22) Filed: Jul. 7, 2000

(51) Int. Cl.[7] .................................................. G09G 5/00
(52) U.S. Cl. ......................... 345/1.1; 345/32; 348/744
(58) Field of Search ........................... 345/1.1, 169, 32, 345/905; 359/443; 353/122, 119; 348/744, 751; 455/575, 90

(56) References Cited

U.S. PATENT DOCUMENTS

| | | | | |
|---|---|---|---|---|
| 5,060,152 A | * | 10/1991 | Maeser et al. | 379/93.25 |
| 5,175,759 A | * | 12/1992 | Metroka et al. | 455/569 |
| 5,187,510 A | * | 2/1993 | Vogeley et al. | 353/122 |
| 5,218,389 A | * | 6/1993 | Harlon et al. | 353/122 |
| 5,461,437 A | * | 10/1995 | Tanaka et al. | 353/71 |
| 5,483,250 A | * | 1/1996 | Herrick | 345/32 |
| 5,510,806 A | * | 4/1996 | Busch | 345/87 |
| 5,658,063 A | * | 8/1997 | Nasserbakht | 353/122 |
| 5,969,698 A | * | 10/1999 | Richard et al. | 345/7 |
| 6,266,048 B1 | * | 7/2001 | Carau, Sr. | 345/168 |

* cited by examiner

Primary Examiner—Bipin Shalwala
Assistant Examiner—Ricardo Osorio
(74) Attorney, Agent, or Firm—Darby & Darby

(57) ABSTRACT

A cellular phone, which is still compact in size and weight, but which also includes a mechanism for displaying received wireless data in its original page format as sent from the original source, thus allowing for the viewing of each original page as a whole page and not as a series of partial pages. The phone also allows the display of received wireless visual data with characters in their true original size, thus allowing for ease of reading and use. The mechanism for displaying data may also be used to display data which is to be transmitted by way of the cellular phone. A cellular phone is provided with an internal optical projector incorporated into the body of the phone so that an original page of visual data can be projected onto a larger surface external to the cellular phone. The external surface is larger than the surface area of the cellular phone's own electronic display, and sufficiently large to maintain the original page format and character size. This is accomplished by providing the circuitry inside the cellular phone with the ability to display the received wireless data representing the visual image on the built-in display of the cellular phone using conventional display device drivers, as well as on an external surface utilizing an internal optical projector which then projects the original image onto the external directed surface. An auto focus capability or manual focus dial is provided to allow for sharp imaging on the external surface. A computer mouse or other manipulation device or user input device may be provided on the surface of the cellular phone so that as the projected image is viewed it can be controlled through visual icons or edited as on a regular electronic screen.

5 Claims, 3 Drawing Sheets

CELLULAR PHONE WITH BUILT IN OPTICAL PROJECTOR FOR DISPLAY OF DATA

FIELD OF THE INVENTION

The present invention generally relates to the field of data communications. More specifically, the present invention relates to a cellular phone for receiving electronic data through a wireless network, for example, the Internet, and displaying the data by way of a built in optical projector which projects the received data onto an external surface.

BACKGROUND OF THE INVENTION

Cellular phones allow for mobile voice communication when on the go, from practically anywhere. As cellular phones have become smaller and lighter, they have become even more convenient to carry on one's person. At the same time, with the growing popularity of the Internet, cellular phones are being used as receivers of not only voice data, but of various forms of visual data, such as E-mail, various forms of processed documents, graphics, pictures and video. While the compactness of a cellular phone is advantageous for portability with regard to ordinary voice communication, this diminution in size, by its very nature, creates a built in disadvantage with respect to the display of visual data, viz., the display is too small to practically present most documents and visual data in their original full page format so as to be viewable and readably by a user. One solution to this problem is to arbitrarily reformat each page into several smaller pages, so as to be contained in the viewing frame of the cellular phone's built-in small screen. The user is then forced to scroll through and wade through many small pages to read what might have originally been sent as one page. Additionally, because of the inherent small screen size, the individual characters of displayed documents are hard to read because they themselves, out of necessity, are diminished in size. Further, given the limited viewing size of the display, graphical images are oftentimes not displayed properly.

One solution to the above-mentioned problem is presented in U.S. Pat. No. 5,970,418, the contents of which are incorporated herein by reference, which discloses a personal communicator with an integrated virtual image display. Specifically, what is disclosed is a wireless handset phone which utilizes optics to create a virtual image which is displayed on a viewing surface attached to the phone itself, for example, by way of pivoting support arms.

These shortcomings and inconveniences have discouraged many individuals from using Internet ready cell phones to their full advantage.

A partial solution to some of these problems has been attempted through the enlargement of displays on certain models of cellular phones. However, since there is a direct inverse relationship between the size of an incorporated display in a handheld wireless device and the size and weight of such a device, this approach is less than salutary. The increased size of the built-in display defeats the portability and compactness of the portable communication device.

SUMMARY OF THE INVENTION

The present invention addresses the above-mentioned deficiencies in the prior art. The present invention provides a cellular phone, which is still compact in size and weight, but which also includes a mechanism for displaying received wireless data in its original page format as sent from the original source, thus allowing for the viewing of each original page as a whole page and not as a series of partial pages. The present invention also provides for the display of received wireless visual data with characters in their true original size, thus allowing for ease of reading and use. The mechanism for displaying data may also be used to display data which is to be transmitted by way of the cellular phone. Additionally, the present invention allows for the display size to be adjustable and variable, including the enlargement of the original data received, depending on the particular circumstance and application. This allows for the viewing of video or picture information in a comfortable fashion.

In accordance with the present invention, a cellular phone is provided with an internal optical projector incorporated into the body of the phone so that an original page of visual data can be projected onto a larger surface external to the cellular phone. The external surface is larger than the surface area of the cellular phone's own electronic display, and sufficiently large to maintain the original page format and character size. This is accomplished by providing the circuitry inside the cellular phone with the ability to display the received wireless data representing the visual image on the built-in display of the cellular phone using conventional display device drivers, as well as on an external surface utilizing an internal optical projector which then projects the original image onto the external directed surface. An auto focus capability or manual focus dial is provided to allow for sharp imaging on the external surface.

Additionally, a computer mouse or other manipulation device or user input device may be provided on the surface of the cellular phone so that as the projected image is viewed it can be controlled through visual icons or edited as on a regular electronic screen.

One of the advantages of the present invention is that before sending an E-mail or any document or data file from the cellular phone, a user can view the image in its complete page format and in a convenient and accessible size.

While the description of the present invention is presented by way of an example to a cellular phone, it should be understood that the principles of the present invention are equally applicable to other small, compact, mobile communication devices, such as beepers, pages, personal digital assistants and the like.

DETAILED DESCRIPTION OF THE PREFERRED EMBODIMENTS

Figure 1:
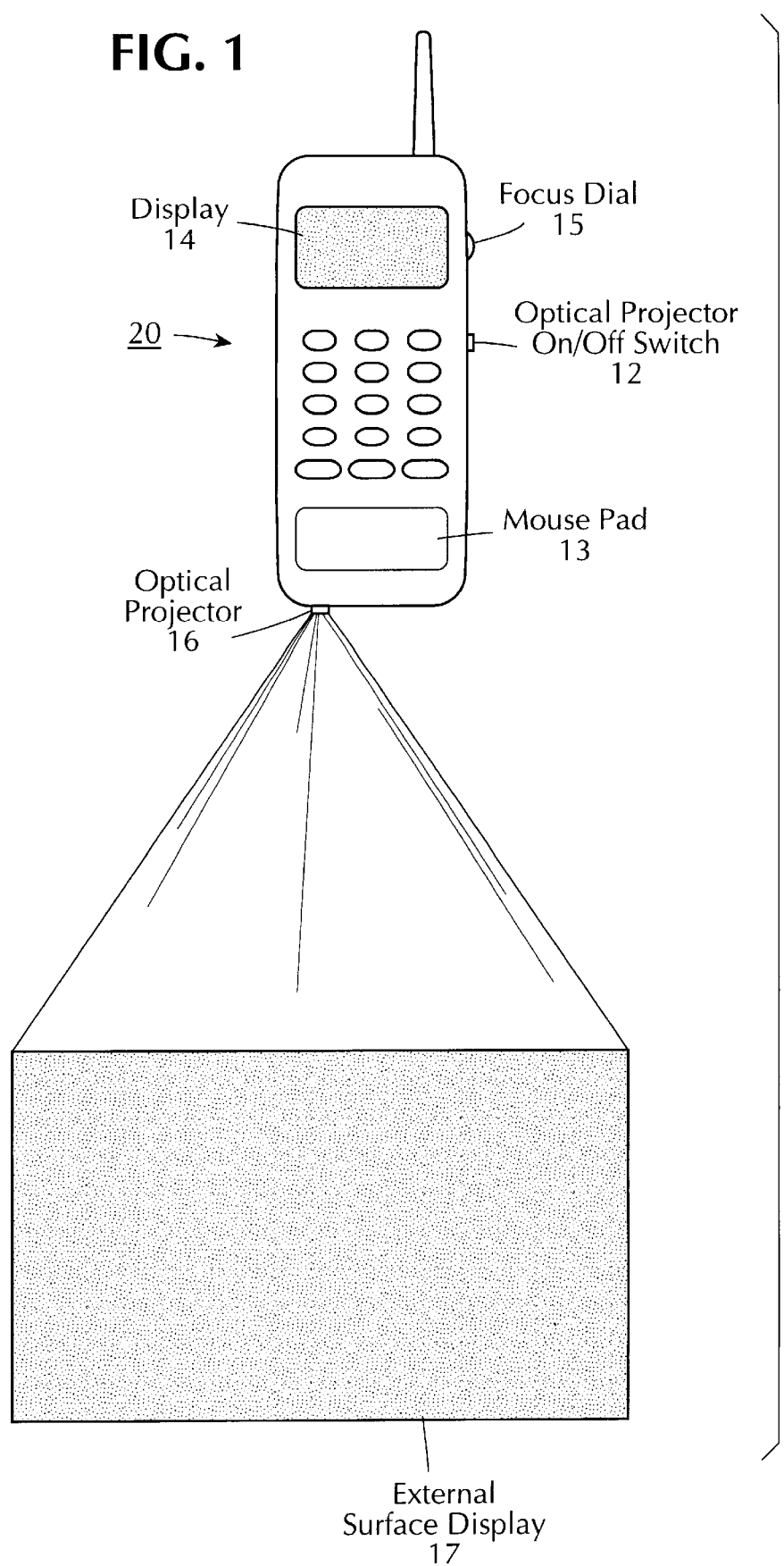
FIG. 1 is a pictorial diagram of a cellular phone incorporating an optical projector display system in accordance with the present invention.

Referring now to FIG. 1, therein is illustrated a cellular phone 20 in accordance with the present invention. The phone 20 includes a display 14, as is well known in the art. The phone 20 also includes an optical projector 16 for projecting images onto an external display surface 17, such as a desk, wall, sheet of paper or the like. The phone 20 further includes an optical projector ON/OFF switch 12 for switching the visual display provided by the phone between the built-in display 14 and the optical projector 16. The ON/OFF switch is not necessary to the implementation of the present invention. In such a case, the phone provides the same display information to both the built-in display 14 and the optical projector 16 and the user determines which display output to view.

The phone 20 may also optionally include a mouse pad 13 for receiving user input. The user input may be provided to navigate through a document, select portions of a document, or manipulate a document or other image being displayed on the external display surface 17.

The phone 20 may also be provided with a focus dial 15 for adjusting the image displayed on the external display surface 17.

Figure 2:
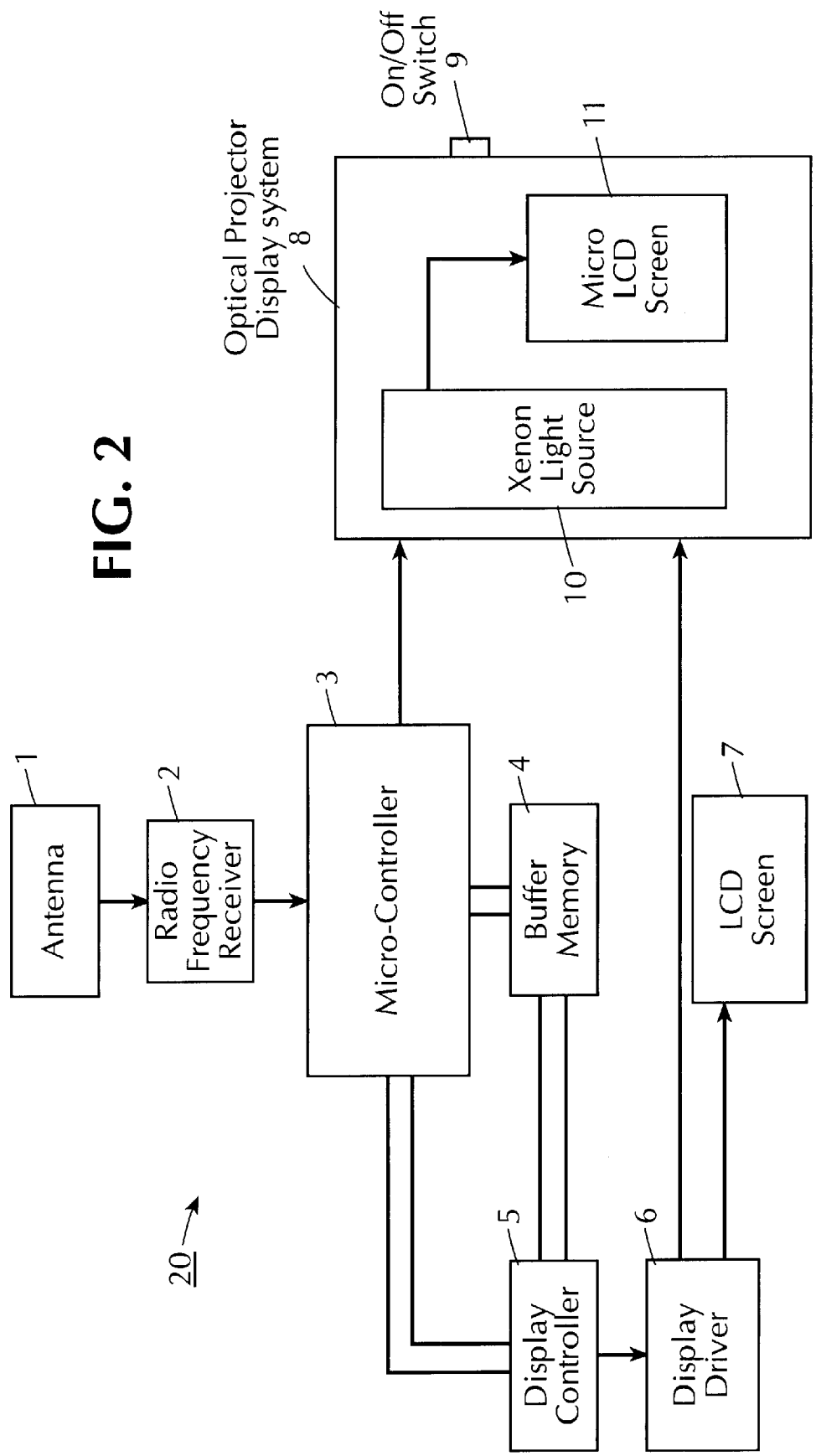
FIG. 2 is a block diagram of the internal components of the cellular phone in accordance with the present invention.

The internal components of phone 20 will now be described by way of reference to FIG. 2 which is a block diagram illustration of the internal components of cellular phone 20. Referring now to FIG. 20, cellular phone 20 includes an antenna 1, radio frequency receiver 2 and microcontroller 3, as is conventional and well known in the art. The cellular phone 20 also includes a transmit section (not shown) for processing and transmitting information as is well known in the art. In the receive direction, radio frequency signals are received via antenna 1, demodulated by receiver 2 and then input as receive data to microcontroller 3 for subsequent processing and handling. The receive data may include audio information which is processed and handled in a conventional manner, as is well known in the art, and, therefore, will not be discussed further herein.

The receive data, which may also include text, graphics, or video, may be stored in buffer memory 4 and then provided to display controller 5. Display controller 5 is controlled by microcontroller 3 and operates to format the receive data stored in buffer memory 4 and to provide the properly formatted data to display driver 6 for subsequent display. When the phone 20 is operating in conventional display mode, i.e., ON/OFF switch 12 is set to OFF, LCD screen 7 is activated and the display driver 6 operates to display the received data on LCD screen 7. LCD screen 7 may be any of a number of commonly used built-in displays for cellular phones or other mobile devices. While the buffer memory 4 and display controller 5 are illustrated as separate components, it should be understood that one or more of these components may be integrated with microcontroller 3, depending on the particular physical implementation of the circuitry illustrated in FIG. 2.

Display controller 5 controls the display driver 6, which, for example may be controller #1766 or #1767 available from Seiko Instruments, for row and column displays respectively. Display controller 5 takes into account the display format required by the specific electronic display on the cellular phone. Display controller 5 has access to the buffer memory 4 where display information is held and takes this data out of the buffer memory 4, row by row and sends one row of data at a time to the display driver 6. These rows are updated one line at a time to provide a 70 Hz update rate for the entire display frame. Of course, any similar manner of displaying information may be used in accordance with the present invention.

Figure 3:
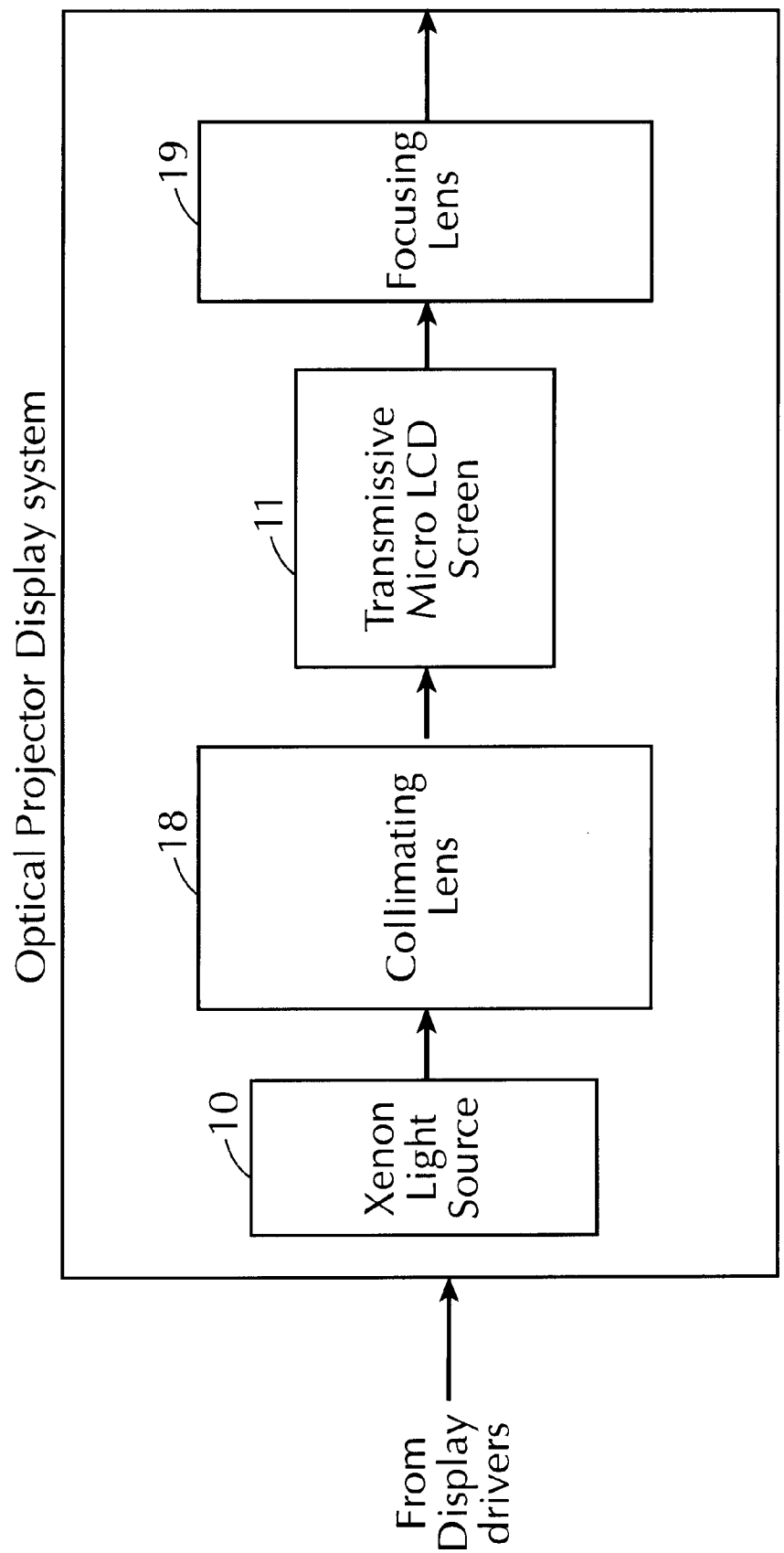
FIG. 3 is a block diagram of the optical projector display system in accordance with the present invention.

When the phone 20 is operating in projector display mode, LCD screen 7 is optionally disabled, and optical projector display system 8 is enabled. In this mode, display driver 6 operates to display the received data via optical projector display system 8, and optionally via LCD screen 7, as well. The optical projector display system is illustrated in further detail in FIG. 3 and includes a high intensity bulb 10, such as a HID (high intensity discharge) xenon bulb available from Welch Allyn (Skaneateles Falls, N.Y.). The light output from the bulb 10 is passed through a collimating lens 18 which evenly distributes the light. According to one embodiment of the present invention, the collimated light is then passed through a transmissive LCD display 11 which is configured by the display driver 6 to display the particular image to be displayed on the external surface. Next, after the display 11, there is placed a focusing lens 19 which can be either automatically operated (auto-focus) or adjusted by the user by way of focus dial. The transmissive LCD display 11 may have an active viewing area as small as a fraction of an inch on a side, up to one inch on a side or more. In one embodiment of the present invention, the display 11 may be of the polysilicon active matrix transmissive display type, and may, for example, be a 1.3" LCD display, part number LCX031ALT available from Sony Corporation.

In an alternative embodiment according to the present invention, the xenon light source 10 and collimating lens 18 may be directed so as to reflect light off of the LCD display 11 to cause the projected image to be displayed on the external surface. According to this embodiment, the LCD display 11 is not a transmissive display, but rather a reflective display in which one side of the display 11 is coated with a mirror-like finish or other reflective surface.

The display 11 may either be monochromatic or color. In the case of a color display, a single display with three built-in color filters may be used. Alternatively, three separate displays, each one having a single color filter may be used, and then the output of the three displays combined into a composite color picture using appropriate optics, as is well known in the art.

In accordance with the present invention, a user is able to view information received by way of a cellular phone or other mobile device, by projecting the information display onto an external surface. In this way, the projected image may be made significantly larger than the image area of a conventional built-in display of the cellular phone. Similarly, the projection of information may be used in connection with the transmission of information, such as is the case, when the user is using the mobile device to compose or transmit a document or some other information. When viewing the displayed information on the external viewing surface, the user is also able to use mouse pad 13 to navigate through the displayed document or information, as well as to select or manipulate portions of or the entire document being displayed.

While the invention has been particularly shown and described with reference to preferred embodiments thereof, it will be understood by those skilled in the art that various changes in form and details may be made therein without departing from the spirit and scope of the invention.

What is claimed is:

1. A hand held wireless mobile device for displaying received information, comprising:
   a display controller operable to format the received information in a first format comprising a plurality of small pages derived from each single original page, and a second format comprising a plurality of original page format pages;
   a built-in display operable to receive the first format information and display one at a time, each of the small pages derived from said original page; and
   an optical projector display system, independent of said built-in display, for displaying the second format information as original page format pages, the display system displaying information on a surface external to the mobile device, the optical projector display system being controlled by the display controller, the optical projector display system further comprising:

a light source for projecting light whereby an image of the original page format information is projected on the external surface.

2. The mobile device of claim 1 further comprising a switch for activating one or both of the built-in display and the optical projector display system.

3. The mobile device of claim 1, wherein the mobile device comprises a cellular telephone.

4. The mobile device of claim 1, wherein the optical projector display system is operable to provide a color image.

5. The mobile device of claim 1, further comprising a light transmissive display screen which operates to provide the original page format information and which is positioned in the vicinity of the light source such that the light source projects light through the light transmissive display screen to thereby project an image of the original page format information provided on the light transmissive display screen onto the external surface for viewing.

* * * * *